United States Patent [19]

Stoppani, Jr.

[11] Patent Number: 5,287,500
[45] Date of Patent: Feb. 15, 1994

[54] SYSTEM FOR ALLOCATING STORAGE SPACES BASED UPON REQUIRED AND OPTIONAL SERVICE ATTRIBUTES HAVING ASSIGNED PIORITIES

[75] Inventor: Peter Stoppani, Jr., Woodinville, Wash.

[73] Assignee: Digital Equipment Corporation, Maynard, Mass.

[21] Appl. No.: 709,626

[22] Filed: Jun. 3, 1991

[51] Int. Cl.$^5$ ............................................. G06F 13/10
[52] U.S. Cl. .................................. 395/600; 395/200; 395/425; 364/DIG. 1; 364/246; 364/281.6; 364/966.1
[58] Field of Search ............... 395/700, 200, 600, 800, 395/425

[56] References Cited

U.S. PATENT DOCUMENTS

| | | | |
|---|---|---|---|
| 4,310,883 | 1/1982 | Clifton et al. | 364/200 |
| 4,638,424 | 1/1987 | Beglin et al. | 364/200 |
| 4,771,375 | 9/1988 | Beglin et al. | 364/200 |
| 4,849,878 | 7/1989 | Roy | 364/200 |
| 4,974,156 | 11/1990 | Harding | 364/200 |
| 4,993,030 | 2/1991 | Krakaver et al. | 371/40.1 |
| 5,018,060 | 5/1991 | Gelb et al. | 364/200 |

OTHER PUBLICATIONS

Larry Peterson "A Yellow-Pages Service for a Local-Area Network", ACM Computer Communiciation Review, Special Issue, 1988, pp. 235-242.

Primary Examiner—Thomas C. Lee
Attorney, Agent, or Firm—Flehr, Hohbach, Test, Albritton & Herbert

[57] ABSTRACT

A computer file system, for use with a computer system having a multiplicity of distinct data storage devices, includes a management program that defines a set of service attributes which characterize operational characteristics of data storage devices. A service class table stores data denoting which of service attributes characterize each distinct storage device. The management program adds data to the service class table when additional data storage devices are added to the computer system. A storage device selection program responds to file allocation requests, which specify a set of service attributes, by comparing the specified set of service attributes with the data stored in the service class table and selecting one of the data storage devices in accordance with predefined service attribute matching criteria. The service attributes used by the file system may include required service attributes and optional service attributes. In that case, the predefined service attribute matching criteria include criteria requiring that the required service attributes of the selected data storage device, as denoted in the service class table, match all required service attributes specified in the corresponding file allocation request. In addition, there are predefined criteria for maximizing matching of specified optional service attributes with the optional service attributes of the selected data storage device.

2 Claims, 3 Drawing Sheets

SYSTEM FOR ALLOCATING STORAGE SPACES BASED UPON REQUIRED AND OPTIONAL SERVICE ATTRIBUTES HAVING ASSIGNED PIORITIES

The present invention relates generally to data storage management on computer systems having multiple types of storage devices, and particularly to a method and system for automatically determining which storage device is to be used for storing a specified file.

BACKGROUND OF THE INVENTION

Large, commercial computer systems (sometimes called data centers) typically have many types of data storage devices. Such data storage devices include solid state disks (RAM disks), cheap and slow magnetic disks, expensive and fast magnetic disks, striped disks, shadowed disks, optical disks, tape drives, and so on.

Data centers with a large variety of storage devices require sophisticated methods for managing storage. In addition, users and application developers are required to make intelligent decisions about where to place their files. In other words, they must decide which type of storage is best suited for the files they create.

Many storage management systems are built on top of the file systems and operating systems employed by the computer system. In many cases, the storage management systems define or support a particular storage model and use the underlying file system as a storage server that simply puts specified files on specified devices.

For example, in current UNIX TM based systems, each file system is associated with a single disk (or logical volume). If an application program needs to create a file on a particular type of disk (e.g., a shadow set), then it must choose the appropriate file system. In fact, the name assigned to the file by the application implies which disk the file is allocated on.

The present invention is an improvement on prior art file systems, adding to the file system the capability of performing some storage management functions on its own, as well as interacting with storage management software. Using the concept of dividing the available data storage devices into "service classes", the present invention provides a general mechanism for allocating data storage space for newly created files (as well as for subsequent updates or additions thereto) based on a specified service class, thereby avoiding the need for users and application programs to select and specify the particular data storage device on which each new file is to be stored.

SUMMARY OF THE INVENTION

In summary, the present invention is an improved file system storage selection method for use with a computer system having a multiplicity of distinct data storage devices. Each data storage device is assigned a "service class" based on the operational attributes of that device. Typically, the service or operational attributes used to distinguish between service classes are based on speed of access, reliability of the device, availability, and so on.

When application programs and users want to store a new file, instead of specifying a particular physical device or logical volume, the application or user specifies a data storage service class. The file system compares the specified service class with the services classes assigned to its data storage devices, and then allocates space for the new file on any one of its data storage devices which provide the requested level of service.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
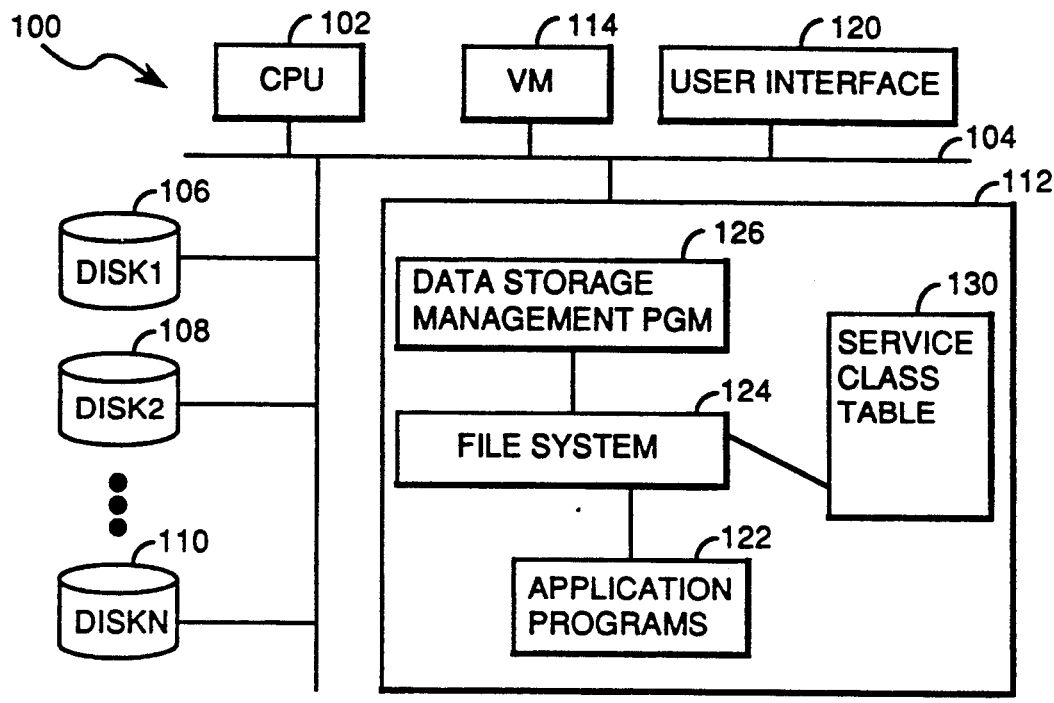
FIG. 1 is a block diagram of a computer system with multiple data storage devices and a file management system.

Referring to FIG. 1, there is shown a computer system 100 having a central processing unit 102 which is interconnected by system bus 104 to secondary memory (e.g., magnetic disk storage devices 106-110), primary memory 112 (i.e., high speed, random access memory), virtual memory manager 114, and one or more user interfaces 120. Stored in primary memory 112 are currently executing application programs 122, as well as operating system software, such as the computer's file manager 124 (also called the file system), data storage management program 126 and associated data structures 130.

Figure 2:
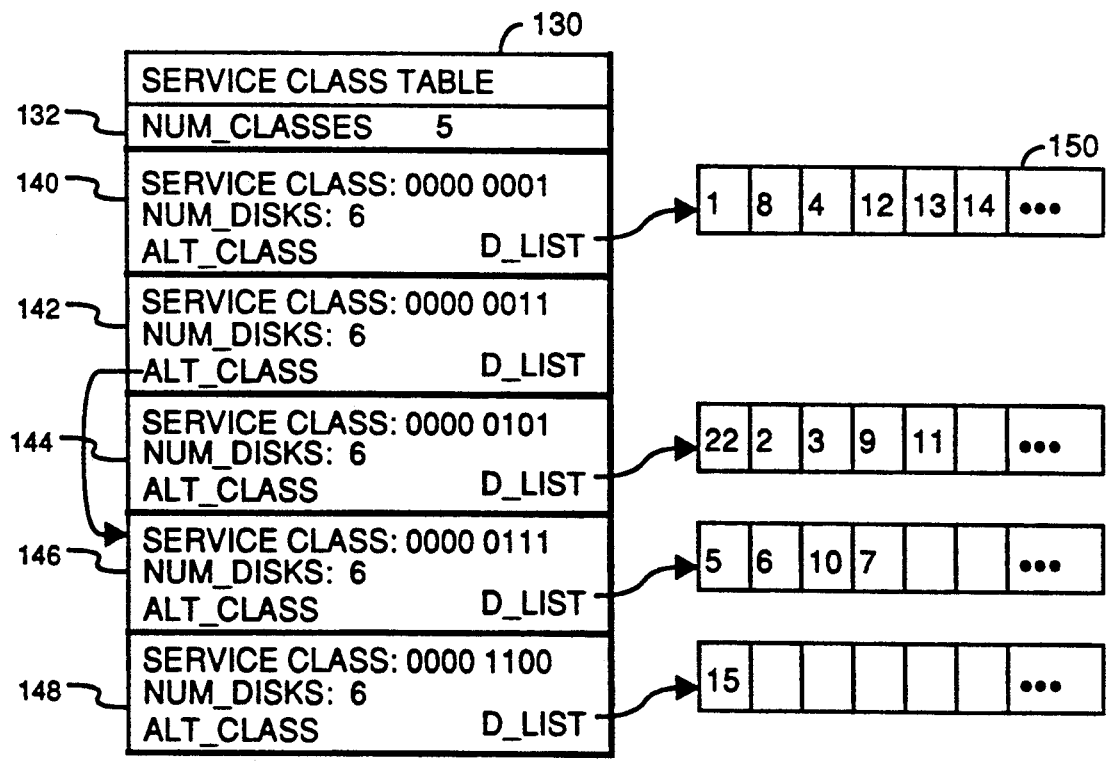
FIG. 2 depicts a service class table data structure.

Referring to FIG. 2, one function performed by the file system 124 is to create a data structure herein called the service class table 130. The service class table 130 in the preferred embodiment lists several distinct "classes" of data storage services. Thus each service class has a corresponding set of "service attributes", which are types of services provided by the data storage devices in that service class. For each such service class, the service class table also provides a device list 150 of the computer system's data storage devices which support that service class.

FIG. 2 shows one example of a service class table 130. The topmost item 132 in the table indicates the number of service classes that are currently defined, which in this example is five service classes. The other entries 140-148 in the table represent distinct service classes. Each service class is identified by a binary number, with each bit of the binary number representing a type of data storage service, also called a service attribute of the service class. Solely for the purpose of providing a simple example, the Service Class Table 130 in FIG. 2 has service class numbers with just eight bits. In this example, the meanings assigned to the service class bits are as follows:

| Bit # | Data Storage Service |
--- | ---
| 0 | Access time less than 20 milliseconds |
| 1 | Shadow Disk |
| 2 | Daily tape backup |
| 3 | 7 × 24 availability |

-continued

| Bit # | Data Storage Service |
|---|---|
| 4-7 | not used |

Each bit in a service class identifier which is set to "1" means that data storage devices in that class provide the corresponding data storage service. In the example represented in FIG. 2, the first service class entry, for service class 0000 0001, represents hard disks with access time less than 20 milliseconds. Stored list 150 denotes six data storage devices as being assigned to this service class, meaning that the computer system 100 has six hard disks which provide the storage services associated with this service class.

Entry 142, which is a "dummy" or "cached" entry representing a subset of the services of entry 146, will be discussed below. Initially, we will assume that entry 142 has not yet been created.

Entry 144, for service class 0000 0101, represents hard disks with access time less than twenty milliseconds and daily tape backup, for which five disks are listed.

Entry 146, for service class 0000 0111, represents hard disks with access time less than twenty milliseconds, daily tape backup, and a shadow disk (i.e., stored data is stored on simultaneously stored two disks), for which four disks are listed.

Entry 148, for service class 0000 1100, represents hard disks with 7×24 availability and a shadow disk.

CREATING NEW SERVICE CLASSES

Figure 3:
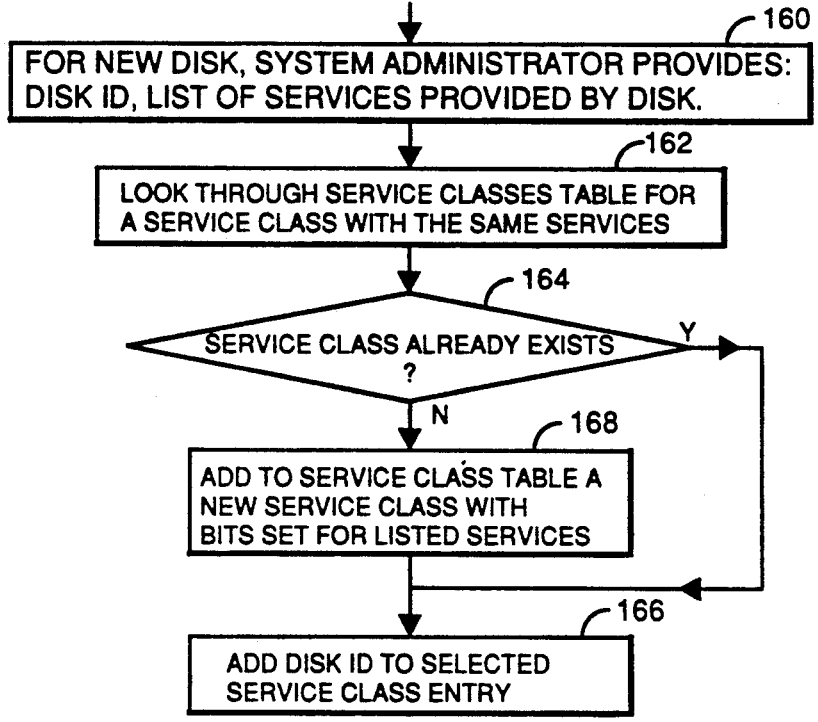
FIG. 3 is a flow chart depicting operation of the file system when adding a new disk.

Referring to FIG. 3, each time that a data storage device 106-110 is added to the computer system 100, a system administrator will run the data storage management program 126, specifying the device's name and a service class. Using the specified device name and service class as parameters, the data storage management program 126 calls the file system 124. The file system 124 then performs the procedure in FIG. 3 to add an entry in the class table 130 for the new data storage device.

The administrator must know what services can be supported by the newly mounted disk, and provides the program with a list of services supported by the disk (step 160). If there is already a service class which supports the listed set of services (steps 162 and 164), then the new disk's identifier is simply added to the device list 150 (step 166). In the preferred embodiment, the data storage management program 126 provides a user interface, enabling the administrator to easily specify the service class information for a newly mounted device, such as by selecting the relevant services from a displayed list. The data storage management program 126 passes this service class information to the file system 124 as a string of binary values with bits set for the specified services.

New service classes are added at this time if the newly added data storage device supports a service, or combination of services, not provided by any of the other data storage devices in the system (steps 164 and 168). For instance, if the system previously had no disks which supported services A and B and C, a new service class would be created by the file system 124 to accommodate the new device. Similarly, if a newly added disk supports services C and D, whereas all previously mounted disks which supported services C and D also supported service E, then a new service class would be generated so as to properly categorize this new disk.

RESPONDING TO A STORAGE REQUEST

Figure 4:
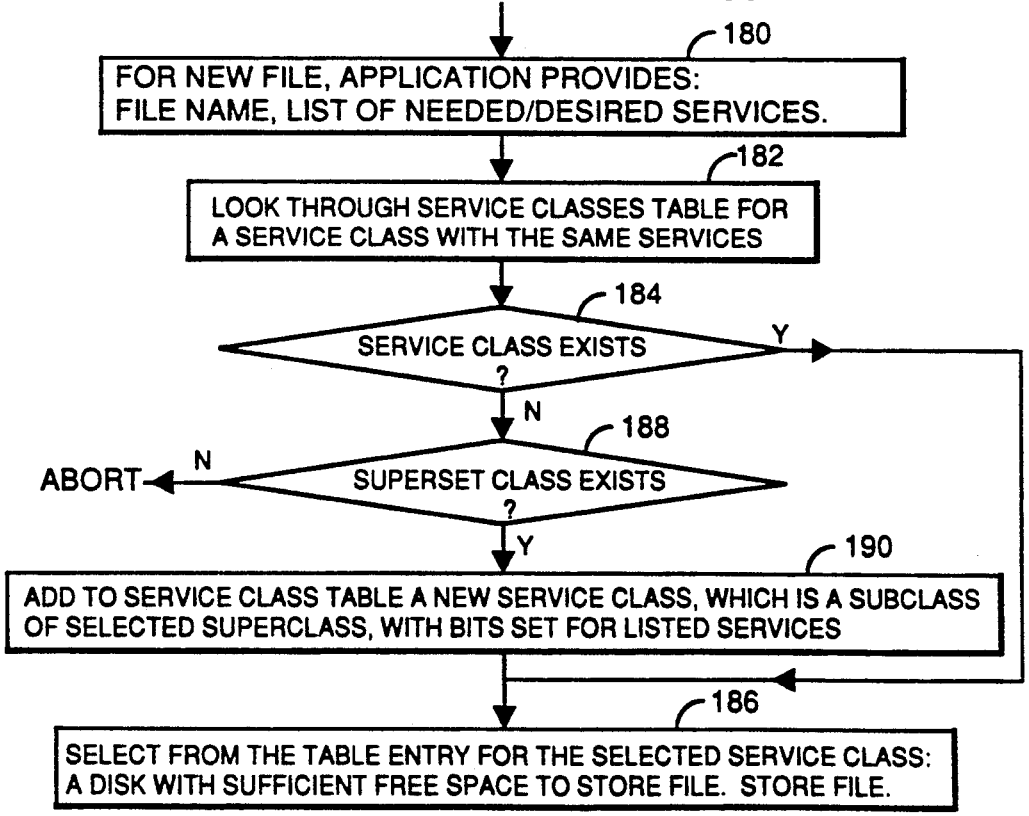
FIG. 4 is a flow chart depicting operation of the file system when allocating storage space for a new file.

Referring to FIG. 4, when a user or application program (hereinafter collectively called the application) creates a new file, the application does not directly select the specific disk to be used. Instead, the application specifies a file name (FN), excluding the disk name, and a service class (SC) which is interpreted by the file system as A list of data storage services either needed or desired by the application (step 180). The file system program looks through the service class table 130 for a service class entry which matches the requested services (step 182). If there is a service class which matches the listed set of services (step 184), then the file system selects a device from that service class's device list 150 which has sufficient free space to store the new file (step 186). The file is then stored in the selected device.

If there is no service class which matches the listed set of services (step 184), but there is a service class (herein called a superset class) which supports not only the requested services but other services in addition (step 188), then the file system will create a new "dummy" or "cached" entry in the service class table representing the requested set of services (step 190). See, for example, entry 142 in FIG. 2, which points to entry 146 as its alternate class. Clearly, a file storage request for service class 0000 0011 will be satisfied by an allocation of storage space in any storage device in service class 0000 0111, because all the requested storage services will be provided, although possibly at a somewhat higher cost than anticipated due to the fact that the selected storage device will also support additional services that were not requested.

Whenever a request is received by the file system for file storage in a service class that does not yet exist, a new "cached" service class entry will be created if there is a superset class of the requested class. Data storage devices in the superset class are used to allocate storage space whenever the cached service class is requested. Cached service class entries are created in the service class table 130 on the assumption that there is a good chance that there will be other requests for the same class, so adding the cached class to the service class table 130 improves performance by removing the need to do the superset class search every time the cached class is requested.

In the preferred embodiment, a cached class cannot be used as an alternate class. This prevents long chains of cached classes and the associated overhead of scanning such chains.

In the example shown in FIG. 2, all hard disks in the computer system 100 with access time less than twenty milliseconds and a shadow disk also have daily tape backup, represented by entry 146 in Service Class Table 130. Therefore, if the service class requested by application has only two bits set, for access time less than twenty milliseconds and shadow disk, the request will be satisfied by using cached service class entry 142, which points to alternate class entry 146, and then allocating space from one of the disks listed in the device list 150 for entry 146.

REQUIRED AND OPTIONAL SERVICE ATTRIBUTES

Figure 5:
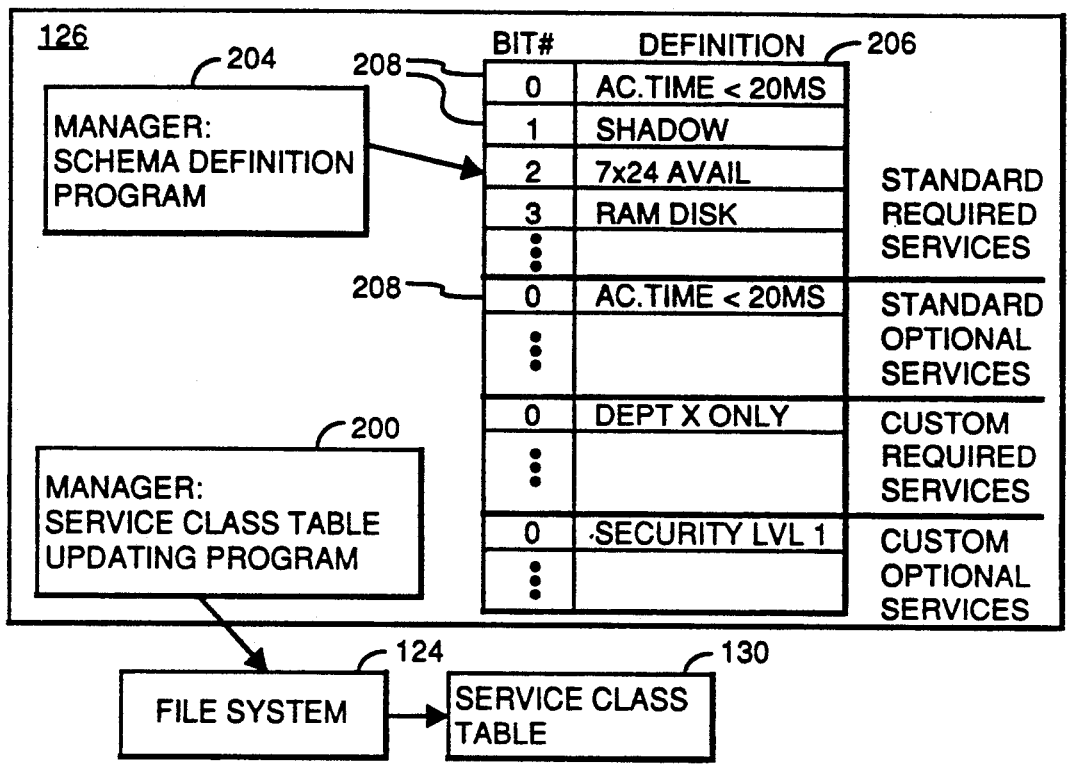
FIG. 5 is a block diagram of certain components of a data storage management module.

Referring to FIG. 5, the data storage management program 126 includes a Schema Definition program 204 used by the computer system administrator to set values in a service class schema 206, which has entries 208 that define the meaning of each bit in the service class identifiers (used in the service class table 130 and in requests by applications to the file system). In the preferred embodiment, each service class identifier (also called the service class number) has one-hundred twenty-eight bits. Thus, the schema 206 defines the usage of the one-hundred twenty-eight bits in each service class identifier. Each service class identifier's bits are divided into four subsets, as follows. Sixty-four bits are to be permanently defined by the operating system's vendor, and sixty-four bits can be defined by purchaser or licensee of the computer system. In addition, thirty-two bits in each half of the schema represent "required" services, while the other thirty-two bits represent "optional" services.

An example of a "custom required service" is a special disk that is used by only one department of a company. Members of the department can ensure use of that disk by setting the appropriate "custom required service" bit in the requested service class identifier.

An example of a "custom optional service" shown in FIG. 5 is the provision of a particular level of data security, such as a disk storage device which automatically encrypts all data stored on that disk.

An example of a "standard optional service" is fast access (e.g., access time less than 20 milliseconds), which is also a required service. Thus, an application may require the use of a shadow disk, while fast access time is desirable, but optional. To request that type of data storage, the application sends a request to the file system with a requested service class identifier that has a required service bit set for shadow disk, and an optional service bit set for fast access.

In the service class table 130, each bit in a service class identifier which is set to "1" means that data storage devices in that service class provide the corresponding data storage service. In a data storage request sent by an application program to the file system 124, each bit in the requested service class which is set to "1" represents either a required service or an optional service that is being requested by the application.

The use of required and optional services is as follows. When an application requests storage in a specified service class, the file system must allocate space in a device which provides all the services represented by the "required" bits in the specified service class. The "required" bits include both standard required services bits and custom required services bits that have been set to "1" by the application.

Whenever more than one service class provides all the requested required services, the file system will select one of those service classes in accordance with predefined criteria for maximizing matching optional service attributes of the request with the optional service attributes of the available service classes. For instance, the file system could select the service class which satisfies the largest number of the requested optional service attributes. A preferable selection technique or criteria is to assign priorities to the optional services, and then to select a data storage device in a service class with optional service attributes, as denoted in the service class table, which most closely matches the requested optional services in accordance with the assigned priorities.

ALLOCATION BASED ON AVAILABLE FREE SPACE

Figure 6:
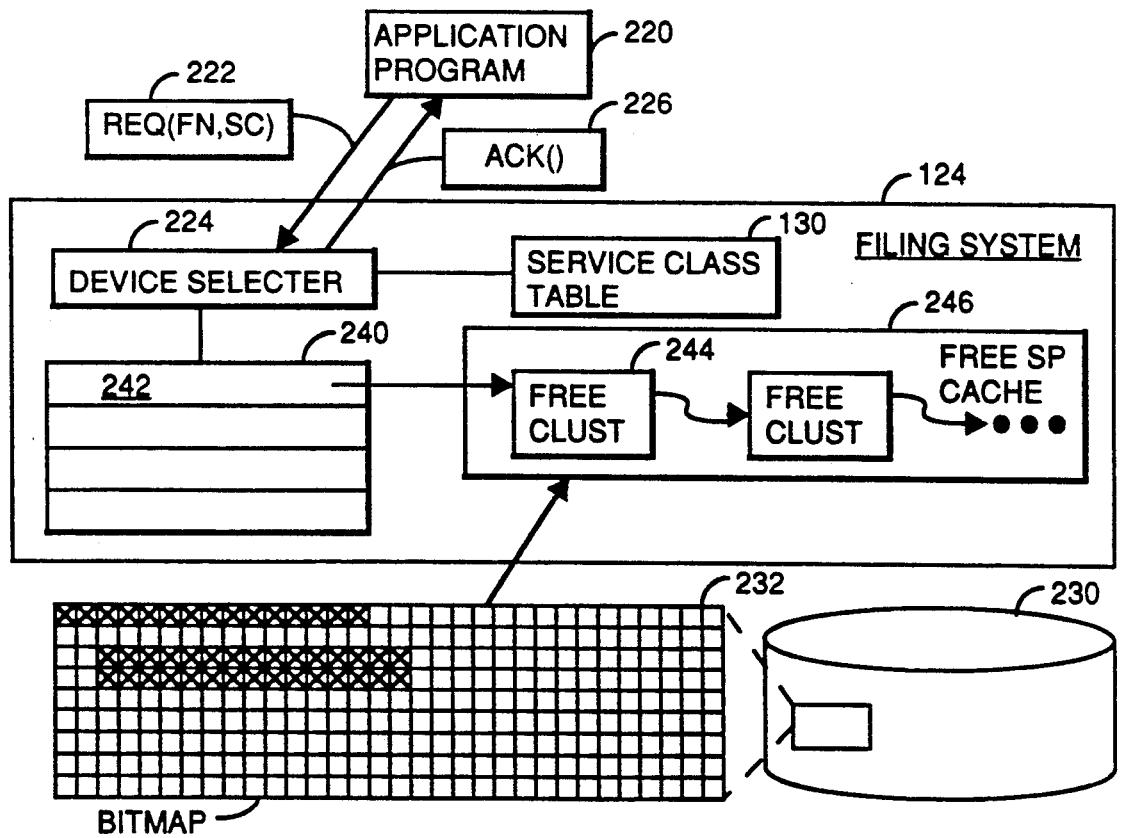
FIG. 6 is a block diagram of certain components of a filling system module and their interactions with other components of a computer system.

Step 186 in FIG. 4 indicates that the file system 124 selects a data storage device not only by selecting a service class, by also be checking the data storage devices in the selected class for sufficient free space to store a new file. FIG. 6 is a conceptual diagram of how the file system 124 keeps track of the free space available on each data storage device in the computer system. As shown, an application program 220 sends a file allocation request 222 having a file name FN and a requested service class SC to the file system 124. The device selecter routine 224 determines which data storage device to use and allocates space on that device for storing the application's file.

The flow chart in FIG. 4 shows the procedure used by the device selecter routine 224 to select a service class. Step 186 of FIG. 4 works as follows. For each data storage device, such as disk 230, the file system maintains a bitmap 232 or equivalent set of data that indicates all the free space on the device. In the case of hard disks, the bitmap 232 typically indicates free storage clusters of a predetermined size.

The file system 124 maintains in primary memory a free space table (sometimes called a mounted disk table) 240, with a separate record or entry 242 for each data storage device mounted on the computer system. The record 242 points to a linked list of free storage descriptors 244, each of which represents a contiguous set of free storage clusters. Since the amount of primary memory which can be dedicated to this function is limited, the free storage descriptors 244 are stored in a fixed sized cache 246, representing a subset of the available free space. Disk space is allocated to files from the free storage descriptors 244, and the free storage descriptors kept in the cache 246 are updated as space on the various storage devices is used and relinquished. Each record 242 will also typically contain a flag that indicates either whether or not the device is full (e.g., when it has less than a predefined amount of free space), or a numerical value that indicates the number of free clusters remaining on the device.

The device selector routine 224 uses the data in the free space table 240 to ensure that sufficient available space is present on the selected data storage device to store an additional file.

FILE SYSTEM IS INDEPENDENT OF STORAGE MANAGEMENT POLICY

An important aspect of the present invention is that the service classes handling routines in the file system are independent of any storage management policy. The file system uses service classes simply as a pattern matching mechanism for selecting storage devices. It is up to the storage management program and the system administrator to determine the meaning of the service class bits. This allows for different storage policies to be implemented using the service class mechanism.

One example of a storage policy would be to require that most or all the required service attributes defined by the schema 202 also be made available as optional service attributes, allowing users and applications the flexibility of prioritizing their data storage needs by indicating which services are required and which are optional. The important point, however, it that this is just one example of a policy that can implemented using the service classes mechanism. Other policies can be selected by each computer system's administrators. Using the present invention, the file system 124 doesn't need to know anything about storage policy. Its job is simply to select a storage device quickly, and in accordance with the applications requirements.

ALTERNATE EMBODIMENTS

In an alternate embodiment of the present invention, each set of services could be assigned a unique numeric value. This would allow for $2^N$ potential services rather than N services provided by the preferred embodiment (where N is the number of bits in each service class identifier). However, this approach is not able to handle the following situation. An application has specified the service FAST for all the files created by the application. However the application is sold to a company that is highly concerned about losing its data, so all of its disks are FAST and AVAILABLE (e.g., fast shadow disks). Using this alternate approach, the service class for FAST would be different from the service class for FAST+AVAILABLE. The approach taken in the preferred embodiment handles this situation easily because FAST+AVAILABLE is a superset class for FAST.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A file system for use with a computer system having a multiplicity of distinct data storage devices, comprising:

service class table means for storing data, including a plurality of service class values, each service class value designating a separate service class; wherein each said service class value comprises a set of N (where N>3) binary values associated with at least one of said distinct storage devices;

schema means for characterizing operational characteristics of data storage devices with a set of service attributes, and for associating each service attribute with a selected one of said N binary values in each said service class value; said service attributes including required service attributes and optional service attributes wherein said optional service attributes have assigned priorities;

said service class table means denoting which of said required service attributes and which of said optional service attributes are applicable to each of said distinct storage devices;

supplementing means, coupled to said service class table means and said schema means, for adding data to said service class table means when additional data storage devices are added to said computer system;

usage status means for providing space availability data indicating availability of space in each said storage device for storing additional files; and storage device selection means, coupled to said service class table means and said usage status means, for responding to file allocation requests specifying a requested service class value, said requested service class value specifying a set of required service attributes and a set of optional service attributes, by comparing said requested service class value with said data stored in said service class table means and selecting one of said data storage devices in accordance with predefined service class value matching criteria; said predefined service attribute matching criteria used by said storage device selection means including criteria requiring that said space availability data in said usage status means indicate sufficient available space in the selected data storage device to store an additional file;

wherein said predefined service attribute matching criteria used by said storage device selection means include criteria requiring that the required service attributes of the selected data storage device, as denoted in the service class table means, match all required service attributes specified by said requested service class value, as well as criteria for selecting a data storage device with optional service attributes, as denoted in the service class table means, which most closely matches said optional service attributes specified in said file allocation request in accordance with said assigned priorities if a plurality of said data storage devices have the required service attributes specified in said file allocation request.

2. A method of allocating storage space in a computer system having a multiplicity of distinct data storage devices, comprising the steps of:

defining a set of service attributes that categorize the operational characteristics of said data storage devices; said service attributes including required service attributes and optional service attributes wherein said optional service attributes have assigned priorities;

storing in a computer memory a service class table of data, including a plurality of service class values, indicating which of said required service attributes and which of said optional service attributes are applicable to each of said distinct storage devices; wherein each said service class value comprises a set of N (where N>3) binary values associated with at least one of said distinct storage devices and each of said binary values is associated with one of said service attributes;

adding data to said service class table when additional data storage devices are added to said computer system, adding to said service class table data indicating which of said service attributes are applicable to said additional storage device;

storing and maintaining space availability data indicating availability of space in each said storage device for storing additional files; and responding to a file allocation request specifying a set of service attributes by comparing said specified set of service attributes with said data stored in said service class table and selecting one of said data storage devices in accordance with predefined service attribute matching criteria; said specified set of service attributes in said file allocation request including specified required service attributes and specified optional service attributes; said predefined service attribute matching criteria including criteria requiring that said space availability data indicate sufficient available space in the selected data storage device to store an additional file;

said predefined service attribute matching criteria including criteria requiring that the required service attributes of the selected data storage device, as indicated by the data in the service class table, match all required service attributes specified in said file allocation request, as well as criteria for for selecting a data storage device with optional service attributes, as indicated by the data in the service class table, which most closely matches said optional service attributes specified in said file allocation request in accordance with said assigned priorities if a plurality of said data storage devices have the required service attributes specified in said file allocation request.

* * * * *

UNITED STATES PATENT AND TRADEMARK OFFICE
CERTIFICATE OF CORRECTION

| | | |
|---|---|---|
| PATENT NO. | : 5,287,500 | Page 1 of 1 |
| APPLICATION NO. | : 07/709626 | |
| DATED | : February 15, 1994 | |
| INVENTOR(S) | : Peter Stoppani, Jr. | |

It is certified that error appears in the above-identified patent and that said Letters Patent is hereby corrected as shown below:

IN THE TITLE

Title page, Delete "PIORITIES" and insert therefor --PRIORITIES--

IN THE CLAIMS

Column 9, Claim 2, Line 3, Delete the second occurrence of "for"

Signed and Sealed this

Thirty-first Day of July, 2007

JON W. DUDAS
*Director of the United States Patent and Trademark Office*